United States Patent
Le Garrec et al.

(10) Patent No.: US 11,332,084 B2
(45) Date of Patent: May 17, 2022

(54) METHOD FOR ADAPTING A WIRING HARNESS FOR A MOTOR-DRIVEN LAND VEHICLE

(71) Applicant: PSA AUTOMOBILES SA, Poissy (FR)

(72) Inventors: Thierry Le Garrec, Marly le Roi (FR); Pascal Duverger, Noisy le Roi (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/440,560

(22) PCT Filed: Mar. 5, 2020

(86) PCT No.: PCT/FR2020/050460
§ 371 (c)(1),
(2) Date: Sep. 17, 2021

(87) PCT Pub. No.: WO2020/201647
PCT Pub. Date: Oct. 8, 2020

(65) Prior Publication Data
US 2022/0089106 A1    Mar. 24, 2022

(30) Foreign Application Priority Data

Apr. 2, 2019  (FR) .................................... 1903513

(51) Int. Cl.
*H01R 43/20* (2006.01)
*B60R 16/02* (2006.01)
(Continued)

(52) U.S. Cl.
CPC ...... *B60R 16/0215* (2013.01); *B60R 16/0238* (2013.01); *B60R 16/0315* (2013.01); *H01R 43/20* (2013.01); *H01R 2201/26* (2013.01)

(58) Field of Classification Search
CPC ............ B60R 16/0215; B60R 16/0238; B60R 16/0315; H01R 43/20; H01R 2201/26
(Continued)

(56) References Cited

U.S. PATENT DOCUMENTS 3,302,065 A * 1/1967 Karol ................... H01R 13/629
439/51
3,581,268 A * 5/1971 Akst ...................... H01R 31/02
439/507
(Continued)

FOREIGN PATENT DOCUMENTS

EP          1401059 A1    3/2004
WO      2008008823 A2    1/2008

OTHER PUBLICATIONS

International Search Report for PCT/FR2020/050460 dated Aug. 27, 2020.
Written Opinion for PCT/FR2020/050460 dated Aug. 27, 2020.

*Primary Examiner* — Timothy J Thompson
*Assistant Examiner* — Michael F McAllister
(74) *Attorney, Agent, or Firm* — Sandberg Phoenix & von Gontard, P.C.

(57) ABSTRACT

The invention relates to a method for adapting a wiring harness (1) for a motor-driven land vehicle in order to enable, without cut or splice, connecting said wiring harness to a computer system that is configured to be temporarily and removably mounted onboard a motor-driven land vehicle, said wiring harness comprising a first connector (4), which is provided with at least one socket (5), in which a plug is removably housed (3), said plug being arranged at one end of an electrical wire (2), and a second connector (7) which is provided with at least one pin (6), said second connector (7) being configured to be connected to an electronic control unit of the vehicle. The invention further
(Continued)

relates to a wiring harness adapted according to such a method as well as to a motor-driven land vehicle provided with such a wiring harness.

3 Claims, 4 Drawing Sheets

(51) Int. Cl.
 B60R 16/023 (2006.01)
 B60R 16/03 (2006.01)
(58) Field of Classification Search
 USPC ........................................................ 174/72 R
 See application file for complete search history.

(56) References Cited

U.S. PATENT DOCUMENTS

| | | | | | |
|---|---|---|---|---|---|
| 3,660,728 | A | * | 5/1972 | Carter | H01R 12/722 |
| | | | | | 361/827 |
| 3,917,371 | A | * | 11/1975 | Hirokawa | H01R 29/00 |
| | | | | | 439/732 |
| 3,950,058 | A | * | 4/1976 | Cronin | H02G 15/10 |
| | | | | | 439/372 |
| 4,384,755 | A | * | 5/1983 | Perretta | H05K 1/147 |
| | | | | | 439/189 |
| 4,726,790 | A | * | 2/1988 | Hadjis | H01R 13/7195 |
| | | | | | 333/185 |
| 4,842,524 | A | * | 6/1989 | Hopkins | H01R 25/003 |
| | | | | | 439/651 |
| 5,026,293 | A | * | 6/1991 | Wilson | H01R 13/6658 |
| | | | | | 439/620.22 |
| 5,072,185 | A | * | 12/1991 | Rockwell | G01R 31/58 |
| | | | | | 29/593 |
| 5,639,246 | A | * | 6/1997 | Holmes | H01R 33/46 |
| | | | | | 439/35 |
| 5,971,799 | A | * | 10/1999 | Swade | H01R 27/02 |
| | | | | | 439/502 |
| 6,469,404 | B1 | * | 10/2002 | Pohjola | H02J 13/00016 |
| | | | | | 307/9.1 |
| 7,112,969 | B1 | * | 9/2006 | Thomas | G01R 31/58 |
| | | | | | 324/503 |
| 7,173,345 | B2 | * | 2/2007 | Brandt | H02J 13/00007 |
| | | | | | 307/DIG. 1 |
| 7,225,065 | B1 | * | 5/2007 | Hunt | H01R 12/675 |
| | | | | | 701/33.2 |
| 7,447,574 | B1 | * | 11/2008 | Washicko | H01R 12/675 |
| | | | | | 701/34.3 |
| 7,862,355 | B2 | * | 1/2011 | Chiou | H01R 29/00 |
| | | | | | 439/189 |
| 8,767,379 | B2 | * | 7/2014 | Whitaker | B60L 1/003 |
| | | | | | 700/17 |
| 8,939,789 | B2 | * | 1/2015 | Lisbona | F24F 11/30 |
| | | | | | 439/502 |
| 10,062,978 | B2 | * | 8/2018 | Henke | H01R 9/2625 |
| 10,553,993 | B2 | * | 2/2020 | Allen | H02G 3/045 |
| 2018/0286531 | A1 | * | 10/2018 | El Haddad | B64D 47/00 |

* cited by examiner

[Fig. 1]
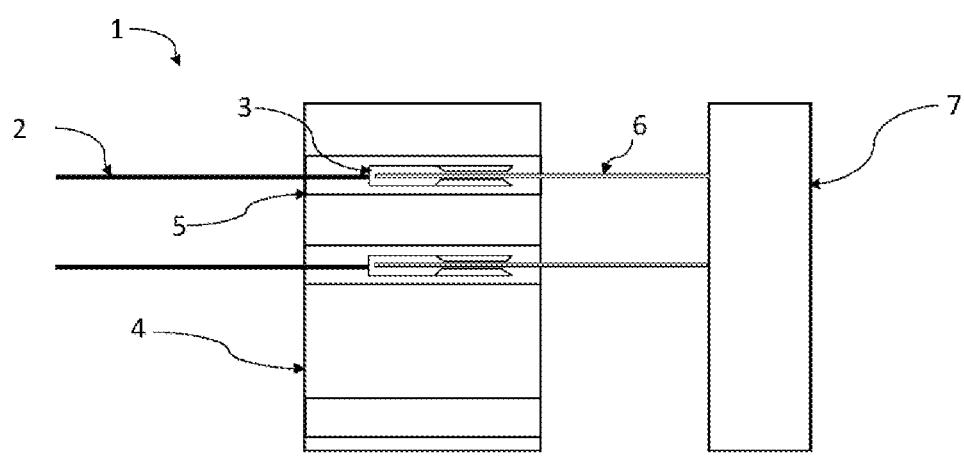

[Fig. 2]
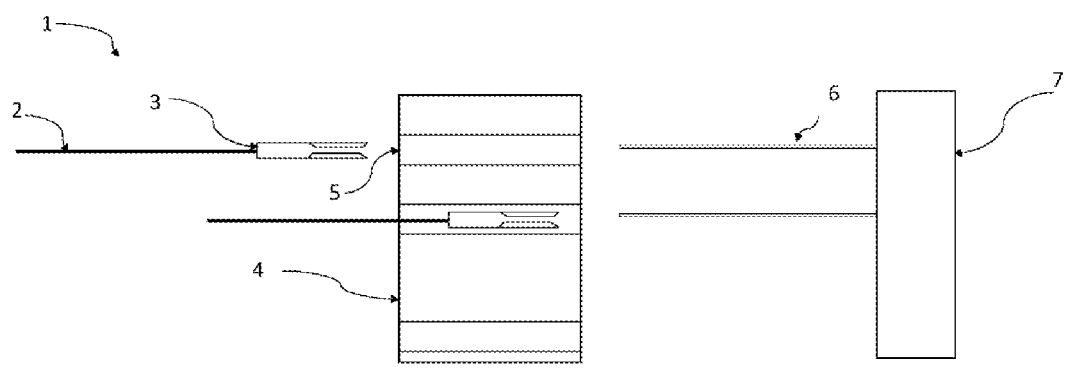

[Fig. 3]
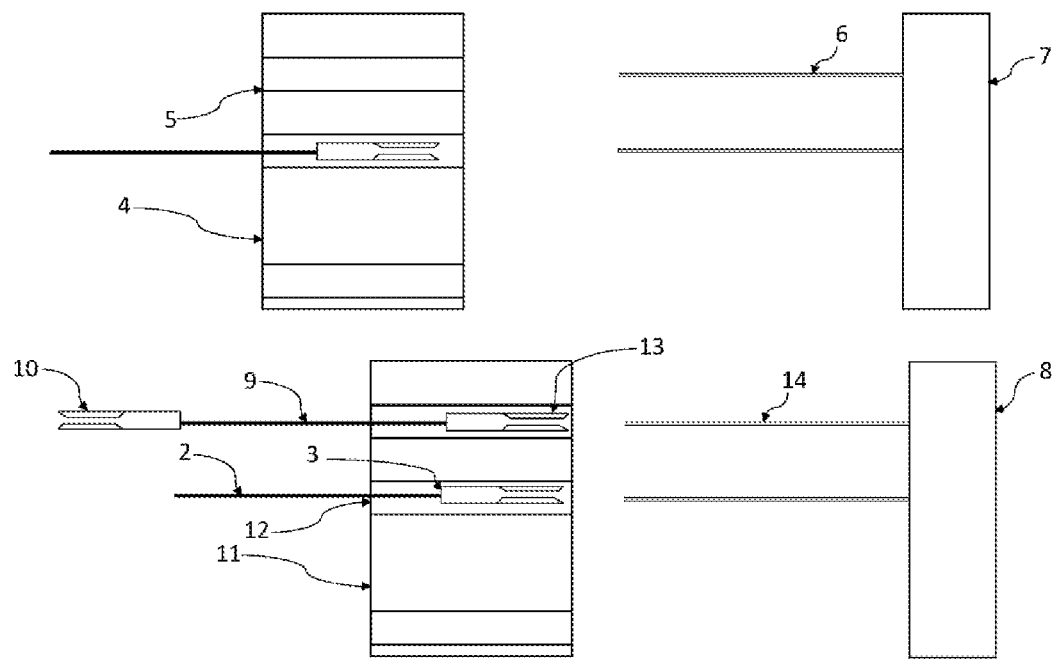

[Fig. 4]
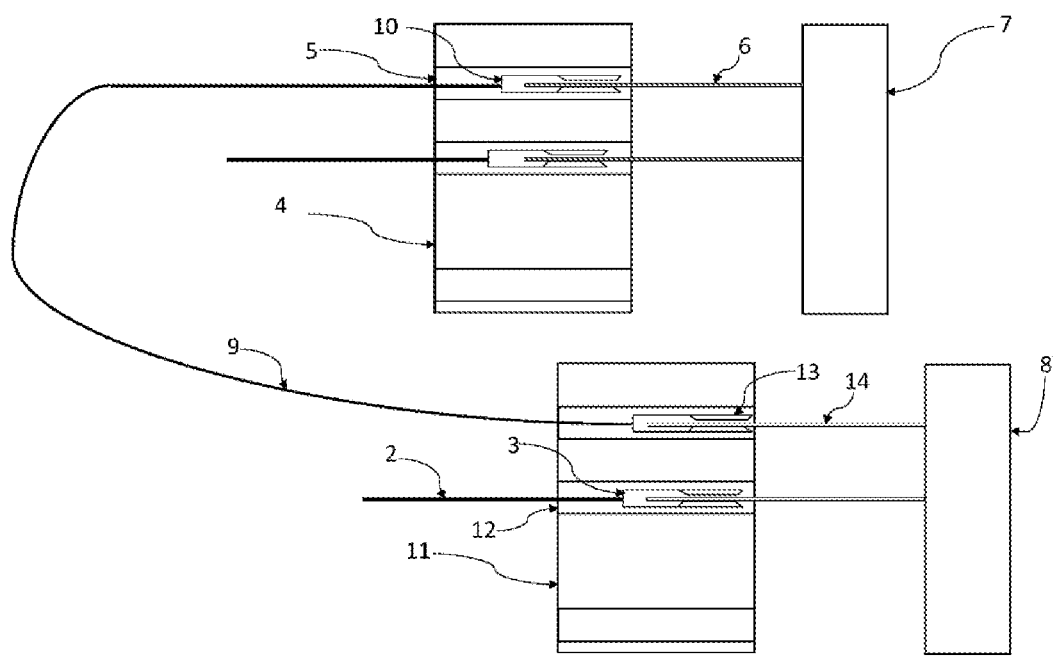

METHOD FOR ADAPTING A WIRING HARNESS FOR A MOTOR-DRIVEN LAND VEHICLE

CROSS-REFERENCE TO RELATED APPLICATIONS

This application is the US National Stage under 35 USC § 371 of International Application No. PCT/FR2020/050460, filed 5 Mar. 2020 which claims priority to French Application No. 1903513 filed 2 Apr. 2019, both of which are incorporated herein by reference.

TECHNICAL FIELD

The present invention relates to the field of wiring harnesses for motor-driven land vehicles. The invention relates in particular to a method for adapting a wiring harness for a motor-driven land vehicle and to a wiring harness for a motor-driven land vehicle adapted by implementing the method. The invention applies in particular to motor vehicles.

SUMMARY

It is known that current motor-driven land vehicles, in particular motor vehicles, are provided with electronic control units between which wiring harnesses, i.e. bundles of electrical cables, are arranged, which make it possible to transmit electrical signals and/or digital data between the electronic control units in order to manage the operation of certain components of the vehicles. These wiring harnesses are positioned in the vehicles during installation phases that generally occur very early in the vehicle manufacturing process so that, after manufacture, dismantling such wiring harnesses generally proves to be very difficult. However, when one wishes to integrate vehicles into carsharing systems or fleet management systems after manufacture, it is necessary to integrate computer systems into the concerned vehicles that allow the functionalities necessary for the operation of carsharing or fleet management systems to be implemented. To do this, it then becomes necessary to connect these computer systems to the various systems that manage the operation of the vehicles, in particular to the electronic control units. Generally, these connection methods are carried out via methods for adapting the wiring harnesses originally installed in the vehicles, most of the time by making cuts and/or splices on them. However, such methods of adapting wiring harnesses using cuts and/or splices can then be a source of serious problems, ranging from imperfect connections, hampering the proper transmission of signals and/or data between the on-board electronic control units, to the risk of vehicle fire.

In addition, generally, the fleet of vehicles used in carsharing or fleet management systems will be periodically renewed. This means that vehicles that have previously undergone modifications to integrate these systems must then be modified again in order to remove the elements that were previously installed. Concretely, this means that the computer systems which have enabled the implementation of the functionalities necessary for the operation of the carsharing or fleet management systems must be removed from the vehicles; consequently, it then becomes necessary to once again adapt the wiring harnesses so that they regain a shape as close as possible to their original shape. However, when the methods of adapting the wiring harnesses that have been previously implemented are based on making cuts or splices, it then becomes nearly impossible to adapt the wiring harnesses again without running the risk of again seeing the appearance of imperfect connections or causing a risk of vehicle fire. Indeed, any electrician knows that an electrical wire that has been cut, the ends of which at the location of the cut are subsequently connected together, for example by means of a sleeve connector, will never be as reliable as an electrical wire that has never been cut (e.g. risk of connection breakage during impacts, risk of creating an electric arc, risk of oxidation of the ends in the location of the cut, etc.).

SUMMARY OF THE INVENTION

The invention therefore aims to provide a method for overcoming these drawbacks. The object is in particular to provide a method for adapting a wiring harness for a motor-driven land vehicle in order to enable, without cut or splice, the connection of said wiring harness to a computer system that is configured to be temporarily and removably mounted on board a motor-driven land vehicle. Furthermore, the object is also to provide an adaptation method that, when the computer system is removed from the vehicle, allows the wiring harness to be adapted again so that it regains a shape that is identical at all points to its original shape, i.e. the shape it had when the vehicle left the production line.

These objects are achieved by a method for adapting a wiring harness for a motor-driven land vehicle in order to allow, without cut or splice, connecting said wiring harness to a computer system that is configured to be temporarily and removably mounted on board a motor-driven land vehicle, said wiring harness comprising a first connector, which is provided with at least one socket, in which a plug is removably housed, said plug being arranged at one end of an electrical wire, and a second connector that is provided with at least one pin, said second connector being configured to be connected to an electronic control unit of the vehicle, the method comprising the steps of:
  removing the plug of the first connector from the socket of the first connector to thus leave the socket of the first connector temporarily vacant,
  procuring a booster connector comprising at least one socket formed to removably house the plug of the first connector and at least one electrical wire provided at one end with a first plug formed to be housed within the first socket of the first connector, the other end of the electrical wire of the booster connector being connected within the booster connector to a second plug,
  inserting the plug of the first connector into the socket of the booster connector, and
  inserting the first plug of the electrical wire of the booster connector into the socket of the first connector left temporarily vacant after the plug of the first connector is removed from the socket of the first connector.

A further object is to provide a wiring harness for a motor-driven land vehicle comprising a first connector provided with at least one socket in which a plug is removably housed, arranged at one end of an electrical wire, and a second connector provided with at least one pin, said second connector being configured to be connected to an electronic control unit of a motor-driven land vehicle, said wiring harness being adapted by implementing a method as described above.

A further object is the provision of a motor-driven land vehicle that comprises a wiring harness as described above.

BRIEF DESCRIPTION OF THE FIGURES

Other features and advantages of the invention will become apparent on examination of the detailed description that follows and from the drawings, in which:

FIG. 1 schematically shows a wiring harness for a motor-driven land vehicle,

FIG. 2 schematically shows a wiring harness for a motor-driven land vehicle after the implementation of a first step of the method, FIG. 3 schematically shows a wiring harness for a motor-driven land vehicle after the implementation of other steps of the method, and FIG. 4 schematically shows a wiring harness for a motor-driven land vehicle after the implementation of another step of the method.

DETAILED DESCRIPTION

FIG. 1 schematically shows a wiring harness 1 for a motor-driven land vehicle. Such a wiring harness comprises a first connector 4 provided with one (or more) socket(s) 5 in which one (or more) plug(s) 3 is (are) removably housed, arranged at one end of an electrical wire 2, and a second connector 7 provided with one (or more) pin(s) 6 and which is configured to be connected to an electronic control unit of the vehicle.

For the sake of clarity of the description, the method for adapting the wiring harness 1 for a motor-driven land vehicle will now be described by considering only the steps relating to a single electrical wire 2 of the wiring harness 1. However, those skilled in the art will understand that the same steps can be reproduced for several electrical wires of the wiring harness 1, and even for all the electrical wires of the wiring harness 1.

According to a first step of the adaptation method, illustrated in FIG. 2, the first connector 4 is first disconnected from the second connector 7, and the plug 3 of the electrical wire 2 is removed from the socket 5 of the first connector 4. Such an operation can be carried out using a screwdriver or other pointed object to interact with a device for securing the socket 5 that makes it possible to removably secure the plug 3 arranged at the end of the electrical wire 2. Such a securing device can for example comprise a screw, a clip or any other equivalent securing element. Thus, it can be seen immediately that, during this first step, no cut is made on the electrical wire 2, which therefore remains in its original shape.

Then, the method for adapting the wiring harness 1 continues by implementing a second and a third step, which are jointly illustrated in FIG. 3. The second step of the method comprises obtaining a booster connector 11 configured to be connected to an interface (or connector) 8 of an on-board computer system allowing the vehicle to be integrated into a carsharing system or fleet management system. The booster connector 11 comprises one (or more) socket(s) 12 formed to removably house the plug 3 that was removed from the first connector 4 during the previous step and at least one electrical wire 9, or electric cable, provided at one end with a plug 10 formed to fit within the socket 5 of the first connector 4, the other end of the electrical wire 9 of the auxiliary connector 11 being connected to a plug 13 formed to connect to a pin 14 of the interface 8. Then, during the third step of the method, the plug 3 of the electrical wire 2 is inserted into the socket 12 of the booster connector 11. Thus, following these two steps of the adaptation method, no cut or splice is made on the wire 2 of the wiring harness 1.

Finally, a final step of the method of adapting the wiring harness 1, illustrated schematically in FIG. 4, comprises connecting the plug 10 arranged at the end of the electrical wire 9 of the booster connector 11 to the socket 5 of the first connector 4 left temporarily vacant following the first step of the process which comprised extracting the plug 3 of the first connector 4 from the socket 5 of the first connector 4.

Consequently, under the terms of the method, it becomes possible to connect a removable computer system to the wiring harness without any irreversible modification of the wiring harness having been made. Indeed, those skilled in the art will understand that, when it becomes necessary to remove the removable computer system from the vehicle, the steps described above can be implemented in reverse so that the wiring harness can regain a shape that is identical in all points to its original shape, i.e. the one it had when the vehicle left the vehicle production line. In addition, it is also understood that the method according to the invention allows a wiring harness to be adapted without there being any need to make any cut or splice on the electrical wires, or cables, that form the wiring harness, which contributes to ensuring the complete integrity of the transmission of signals and/or data between each of the connectors of a wiring harness adapted by implementing the method according to the invention, and without any step of the method being able to cause any risk of fire for the vehicle.

The invention claimed is:

1. A method for adapting a wiring harness for a motor-driven land vehicle, without cutting or splicing wires of said wiring harness, in order to connect said wiring harness to a computer system that is configured to be temporarily and removably mounted on board said motor-driven land vehicle, said wiring harness comprising a first connector, which is provided with at least one first connector socket, in which a plug is removably housed, said plug being at one end of a first electrical wire of said harness, and a second connector that is provided with at least one pin, said pin being removably received by said plug, said second connector being configured to be connected to an electronic control unit of the vehicle, the method comprising the steps of:

removing the plug of the first electrical wire from the first connector socket to thus leave the first connector socket temporarily vacant, procuring a booster connector comprising at least one booster connector socket formed to removably house the plug of the first electrical wire and at least one second electrical wire provided at one end with a first plug formed to be housed within the first connector socket, the other end of the electrical wire of the booster connector being connected within the booster connector to a second plug, said second plug being adapted to receive the pin of said second connector, inserting the plug of the first electrical wire into the booster connector socket, and inserting the first plug of the second electrical wire into the first connector socket left temporarily vacant after the plug of the first electrical wire was removed from the first connector socket.

2. A wiring harness for a motor-driven land vehicle comprising a first connector provided with at least one first connector socket in which a plug is removably housed, said plug being arranged at one end of an electrical wire, and a second connector provided with at least one pin, said second connector being configured to be connected to an electronic control unit of a motor-driven land vehicle, wherein said wiring harness is adapted by implementing the method according to claim 1.

3. A motor-driven land vehicle comprising the wiring harness according to claim 2.

\* \* \* \* \*